May 12, 1959 A. C. PETERSON 2,886,260
ROTARY AIRFOIL AND STATIC WING AIRCRAFT
Filed Nov. 5, 1956 3 Sheets-Sheet 1
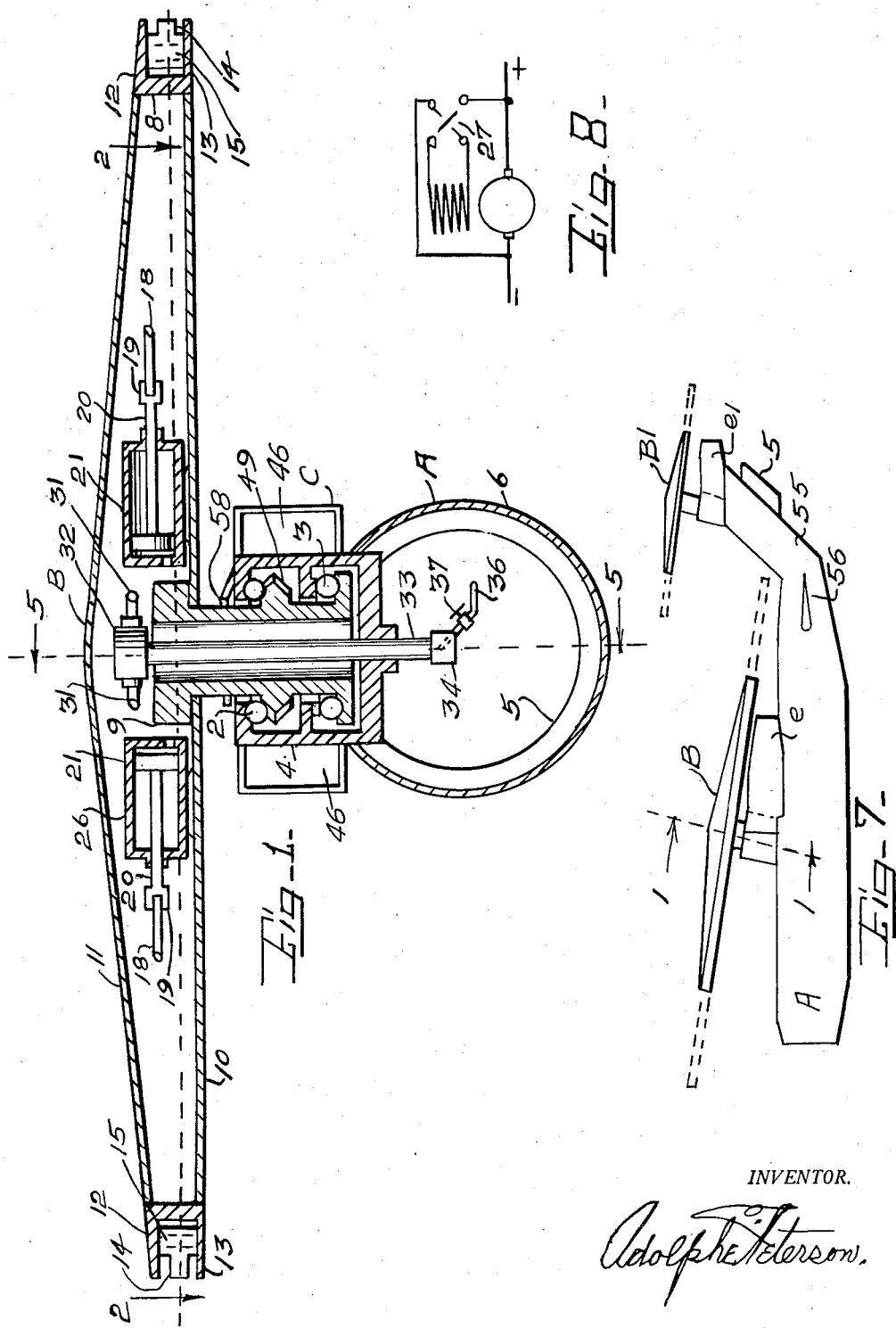
INVENTOR.
Adolphe Peterson.

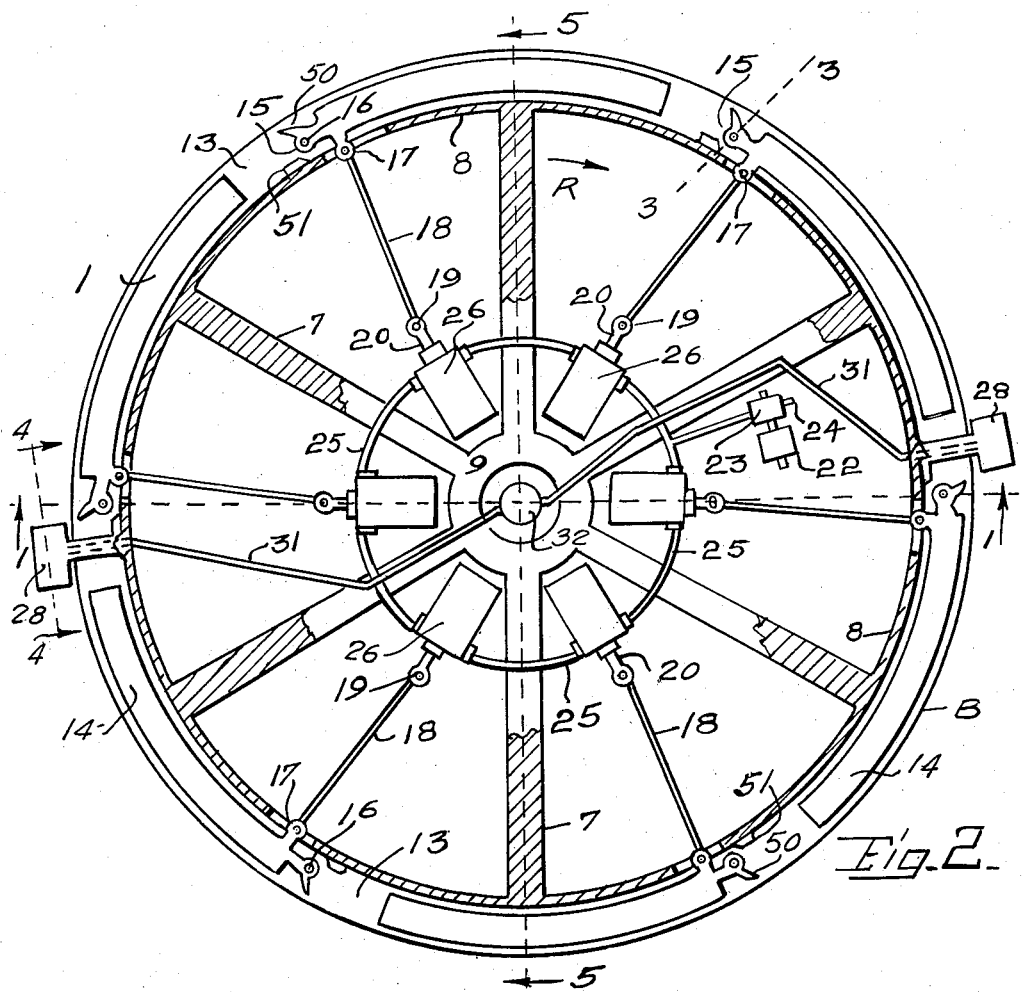
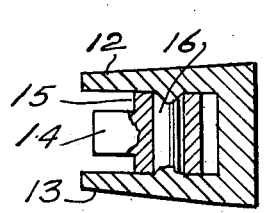
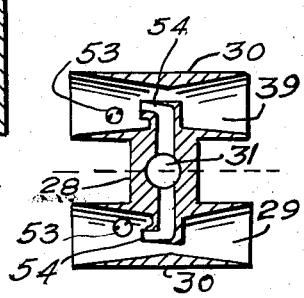
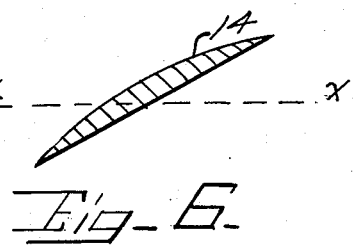

May 12, 1959  A. C. PETERSON  2,886,260
ROTARY AIRFOIL AND STATIC WING AIRCRAFT
Filed Nov. 5, 1956  3 Sheets-Sheet 3

INVENTOR.
Adolphe Peterson.

United States Patent Office 2,886,260
Patented May 12, 1959

2,886,260
ROTARY AIRFOIL AND STATIC WING AIRCRAFT
Adolphe C. Peterson, Minneapolis, Minn.

Application November 5, 1956, Serial No. 620,565

14 Claims. (Cl. 244—7)

My invention relates to aircraft of the class which is adaptable to flight as a fixed wing aircraft or is adaptable to conversion to the rotary airfoil sustained aircraft in flight, and it is therefore called—Rotary Airfoil and Static Wing Aircraft.

The principal objects of my invention are to provide an aircraft which has the ability for flight as a fixed wing aircraft and which has inherently also the ability for conversion in flight to such a shape or type that it can hover and descend or climb, without translational flight; and to provide an aircraft with such abilities in a form which is comparatively simple in construction, and is relatively cheap in manufacture, and is relatively durable and reliable in use, as compared with aircraft of such proposed abilities which have been proposed or attempted. A chief difficulty of aircraft, as proposed, for such convertibility in flight, is that they are complicated, and dependent on considerable mechanism to achieve the convertibility and dual character of use, and it is a prime object of this invention, to provide an aircraft of the convertible class, which can in flight convert from one to the other type, of flight, or sustentation, without difficulty and with a very gradual and easy transposition from the one type of flight to the other, and without any danger to the aircraft or its occupants and without any disturbance of stability in the aircraft. The nature of the wing and its rotor means in this invention is such that there is no disturbance, whatever, to the inherent stability of the aircraft in either type of flight. In general, the object is to provide an improved form of such aircraft, and to provide it in a simple and readily constructed form. A further object is to provide an improvement in construction, and an adaptation of my aircraft as shown in the patent issued May 1, 1956, Number 2,743,885, Rotor and Wing Aircraft, issued to me, as the patentee.

The principal devices and combinations of devices comprising my invention are as hereinafter described and as defined in the claims.

In the accompanying drawings, which illustrate my invention, like characters refer to like parts throughout the several views. Referring to the drawings:

Figure 1 is a view chiefly in section on the lines 1—1 of Figures 2, 5, and 7, this view being a section on a line and plane transversely of the normal direction of flight of the aircraft and a plane which is inclined slightly to the vertical and is slightly less than perpendicular to the normal direction of flight of the aircraft. This plane contains the axis of rotation of the rotor means, in rotor sustentation, and some parts are shown in full front elevation and some broken away.

Figure 2 is a section on a plane which is at right angles to the plane of Figure 1 (the section) and is at right angles to the axis of the rotation (as in Figures 1 and 5), and this figure shows some parts in plan view, and is a section on a plane through the median of the fixed wing, as in flight.

Figure 3 is a detail section on the line 3—3 of Figure 2, showing a part of one airfoil pivot pin in elevation, and the adjacent portion of the associated airfoil blade and its bearing on the pivot pin.

Figure 4 is a detail section on the line 4—4 of Figure 2 to show a section vertically through the pair of ram-jets constituting one unit of the two such units of a pair of ram-jets.

Figure 6 is a diagrammatic view showing a section transversely through one of the extensible airfoils, for sustentation in rotation, and the relation of this section to the plane of the rotor unit B.

Figure 7 is a view in side elevation, on a much reduced scale, of an aircraft embodying two of my rotor and fixed wing means, one forwardly located and the other rearwardly located and smaller.

Figure 8 is a diagrammatic sketch showing the means or a means for reversing of the pump means for control of the rotor airfoil blades.

Figure 5:
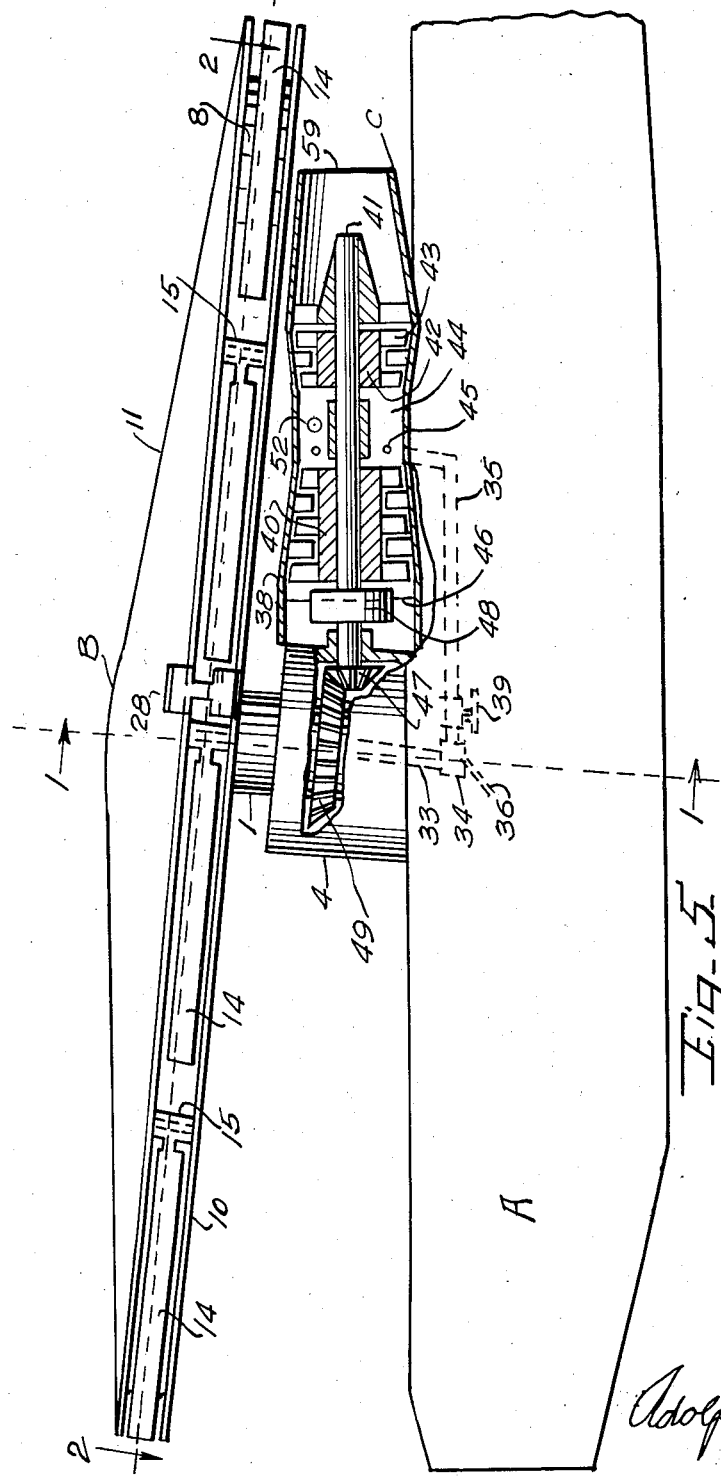
Figure 5 is a view which is chiefly a side elevation of the forward part of the fuselage of the aircraft and the rotor and fixed wing unit, at the forward part of the aircraft, and is in part a section on the lines 5—5 of Figures 2 and 1, being chiefly a section through the turbine power plant and its drive means to the rotor shaft means.

Referring first chiefly to Figures 1, 2, 3, 4, 5 (3 and 4 being relatively enlarged views), these figures show one rotor and fixed wing means mounted on a part of the fuselage of an aircraft, and in these views, A is the fuselage and B the rotor and fixed wing unit and C the power turbine unit. The rotor, fixed wing unit B, will be first described.

The rotor-fixed wing unit B has a tubular shaft 1 which is mounted by bearing means 2 and 3, each of the ball bearing type (or any other type) in a static tubular and cylindrical pylon 4 which is affixed to or firmly welded to the fuselage frame 5, the latter having attached to it, also, the fuselage skin or sheet metal body material 6. The axis of the pylon 4 and the rotor shaft 1 is inclined to the vertical, that is inclined to the plane which is perpendicular to the longitudinal direction of flight of the aircraft and that of the fuselage A, the axis inclining rearwardly of the aircraft as the axis rises upwardly from the fuselage A. This inclination is such that the rotor-fixed wing unit B will rotate in a plane which is inclined to the horizontal direction of flight of the aircraft, in normal flight, so that the wing frame radial members 7, the peripheral circular member 8, and the radially inward member 9 of that frame, will all rotate in that plane which is inclined to the horizontal, and which is somewhat lower relatively to the direction of flight in its rearward portion, than in its forward portion, and this applies equally also to the wing surface wall 10 which is attached to the lower side of the frame members 7, and is in form circular, the plane of the wall 10 being inclined to the horizontal plane or direction of the aircraft. The member 9 is an enlarged portion of the shaft 1 or a circular ring member formed therewith or attached thereto, and is sufficiently strong to bear the rotor means in rotation and to bear the fixed wing means firmly in its inclined position in flight as a fixed wing aircraft.

The upper side of the frame members 7 and 8 have attached to them a circular upper wing wall 11 which is formed of sheet metal or any suitable alloy or plastic material, this wall being formed so that its under side shape is that of an inverted dish or as near that form as will most efficiently serve as the upper surface wall of the unit B when that operates as a fixed wing in flight, the form of this upper wall of the unit B being that form which is most suitable as the upper surface of an airfoil in flight, for sustentation in fixed wing flight. The wall 11 is thin, and the upper surface is substantially the same in form as the lower surface of the wall 11, but the inverse of the dish-shaped lower surface. The space between the wall 10 and the wall 11 should be as thin as is permissible or possible, in conformity with the location and use of the other elements in the unit B.

The peripheral circular member 8 is a circular or cylindrical wall transversely of the unit B, at all points and it is formed as the inner side of a U shape, which embodies also the annular upper member and lower members 12 and 13, respectively, the latter two members being attached to member 8 and forming a U shape, as to transverse section, which is open at the outer side and closed at the inner side by wall or member 8. The members 12 and 13 are sufficiently spaced apart, so that there may be accommodated between them six, or any number as may be determined for any construction, air foil blades, each denoted 14, each of the latter being pivoted by its blade hub 15, at one end of each, on an associated pivot pin 16 which is fixed to the members 12, 13, so that the pivot pin (each), is substantially perpendicular to the plane of the member 8, that is the latter's periphery, and so that the airfoil blades may individually swing on their pivot pins 16, to occupy either the positions, as shown in Figures 2 and 5, each enclosed (at upper and lower sides) within the trough of the U shape formed by members 12, 13, and 8, or in the alternative, the radially extended positions, as more particularly described hereinafter. Each of the airfoil blades 14 has a shape transversely of the blade, at any point along its length, like that customarily used in helicopter blades, or airfoil rotor blades, generally, and this transverse section is substantially such as that as shown in Figure 6, where the line (dotted) X—X represents the plane of the unit B as a fixed wing, this plane being the plane passing substantially centrally through the circular member 8 and transversely of the axis of the member 8.

Each of the airfoil blades 14 has attached to it, near its hub end, or bearing end, by a pivoted connection 17, one end of a flexible cable or rope 18, formed of any suitable material, so that it is flexible throughout most of its length; and the opposite end of each cable 18 is attached, by a pivoted connection 19, to the radially outward end of a piston rod 20, the latter being fixed in or to a control piston 21, so that when the associated control piston 21 (there being six) is moved inwardly toward the axis of the unit B, the cable 18, associated, is drawn with it to exert pull on the associated airfoil blade 14, to pull the latter about its axis in the pivot pin 16, and thereby force the airfoil blade 14 into its respective space within the U-shaped section of the peripheral member, formed by the members 12, 13, 8. Thereby, the control pistons 21 being all simultaneously moved, the airfoil blades 14 are also all simultaneously moved into their enclosed positions, within the U-shape section of the peripheral member 12, 13, 8. This control action is obtained when the pilot of the aircraft by means of the electric motor 22 causes the reversible pump 23 to turn in the proper direction to compress air or liquid drawn by means of the intake pipe 24 into the pump and compressed or forced thereby into the pipes 25 which connect all the radially outward ends interiorly of the invidual cylinders 26 wherein the control pistons 21 individually reciprocate or are reciprocable. As in Figure 8, the circuit through the motor 22 provides for reversing of the motor so that the pump is thereby reversed or reversible. The reversing switch 27 provides for the reversible control of the motor 22. The airfoil blades 14 are all simultaneously, for the converting action, moved by centrifugal force, by rotation of the airfoil unit B, as hereinafter described.

The unit B has two ram-jet units, each designated 28, fixed to the peripheral member 12, 13, 8 at two dimetrically opposite locations, as shown in Figure 2, and each of these ram jet units is comprised of two ram jet conduits 29, each being formed in a ram jet cylinder 30, there being two of the latter for each unit 28, the two cylinders 30 being spaced apart vertically a sufficient distance such that the discharge rearwardly from each, that is rearwardly of the rotation, will not too greatly have impact on the adjacent airfoil blades. But it may be noted that the ram jet units 28 may be located a sufficient distance from each hub section of a blade 14 so that there would not be great impact of gases upon the blade, and that the passage of atmospheric air and its mingling with the jet from the cylinders 30 would to some extent cool this gaseous discharge. Each cylinder 30 receives fuel bearing air or gas from an associated gas conduit 31 and the two latter receive the gaseous fuel from the bearing cap 32 which is rotatable on the upper end of the gaseous fuel pipe 33. At the lower end of the latter there is a mixing chamber 34 into which compressed air may pass from the air pipe 35, and fuel such as kerosine or gasoline may pass from the fuel pipe 36 as controlled by the hand valve 37. The air pipe 35 receives air under pressure from the compressor 38 of the turbine unit designated C, as controlled by the hand valve 39.

The compressor rotor 40 is rotated, with its blades, by the turbine shaft 41, and the latter is rotated by its turbine rotor 42 with its blades 43, and the turbine combustion chamber 44 receives fuel from the fuel supply nozzles 45 (these receiving fuel in any manner as in turbines), and the compressor 38 receives atmospheric air for compression by means of the atmospheric air intakes 46, one of these two being located at each lateral side of the pylon 4. The turbine shaft drives the bevel gear 47 through a clutch 48, the latter being any type of clutch such as may disconnect or connect the bevel gear 47 with turbine shaft 41. This representation of clutch 48 is intended to include any means such as commonly used with clutches, for the connection or disconnection of the clutch. Such means is commonly known and is not therefore specifically shown. The bevel gear 47 is in mesh with the larger bevel gear 49, and drives the latter, when desired, and thereby also may drive the rotor shaft 1, as may be desired, at any time, when the pilot causes clutch 48 to be engaged. The rotor shaft 1 is permanently in driving connection with the frame members 7, 8, 9 of the unit B.

Each airfoil blade hub 15 has a lug 50 formed therewith, and the latter is so placed that when the associated airfoil blade 14 has swung to its radially extended position, the lug 50 will contact the stop 51, of which there are six, one associated with each blade 14, the stops 51 being fixed to or formed with the annular wall 8, and thereby the blades 14, having reached their extended positions, will be prevented from further movement about their pivots 16 and they will be held firmly in the extended positions against the movement of the air past them, or conversely, held in their positions moving against the atmospheric air. The rotor B will in rotation move in the direction of the arrow R, Figure 2. The turbine will have a direction of rotation to procure this rotation. The exhaust or jet from the turbine will be directly rearwardly of the aircraft, and so directed as to provide propulsive thrust for the aircraft. Spark plug 52 in the turbine provides for ignition there. Spark plugs 53 provide for ignition in each ram jet unit 28. The ram-jet fuel is directed from pipes 31 through the nozzles 54.

Referring to Figure 7, this is a diagrammatic view showing the mounting of two units, such as have been above described, on an aircraft fuselage A, the larger unit B being mounted forwardly above the fuselage, the smaller unit B1 being mounted rearwardly upon the rearward end 55 of the fuselage A. The latter bears on it the horizontal rudders 56, one at each side, one only being shown, and it also bears the horizontal steering rudder 57 vertically placed. The unit B1 is substantially the same in all particulars as the unit B, but much smaller and has for its function, provision of some lift for the rearward end of the fuselage, and its own weight, and also the provision of ability to provide balancing of the aircraft in hovering flight, wherein the rotors B, B1, are in rotative action. The unit B1 has its turbine power unit C1.

The operation in general is now described. The pipe 36 and the nozzles 45 will be provided with a fuel supply from any source in the aircraft fuselage. Assuming that the aircraft is at rest on the ground, and that the pilot desires to take off, he starts the turbines C, C1 in operation by any starting means (not shown), as in turbines, generally, and fuel will be permitted to flow to nozzles 45, and when the turbines C, C1 are both in normal operation or at idling speed or above that, the pilot will cause the clutches 48 of both units B, B1 to be engaged. The turbine shafts will then drive the rotor shafts 1 of both units B, B1 and when a sufficient rotative speed of both rotor units B, B1 is reached the airfoil blades 14 of each unit B, B1 will be extended radially outwardly from the spaces within members 12, 13, 8, so that each blade 14 will occupy its radially extended position, and as so extended, the airfoil blades 14 of the two units B, B1 will in rapid movement through the atmospheric air, by impact upon the air, effect lift thrust upon the blade and the other elements of the unit, notably, the frame members 7, 8, 9, and rotor shafts 1, and thereby will give lift effect upwardly to pylons 4 of both units, and the fuselage A, so that, when the turbines operate at substantially full power, the aircraft will rise. In this operation, the pilot may, by opening hand valves 37 and 39, and sending ignition current to the ram-jet spark plugs, by means of contacts 58, cause some air under pressure from the turbine compressors to be directed to pipe 35, and after injection of fuel at 34, to pipes 31 and thereby to nozzles 54, so that as the units B, B1 revolve about their axes in shafts 1, the ram-jets receive atmospheric air in conduits 29 and fuel and air under pressure from pipes 31 and this is combusted, causing thrust effect by the ram jets, as in any ram-jet means, and this thrust is added to that of the torque imparted by the turbines to the units B, B1, and the speed then reaches the maximum speed, so that maximum lift effect is induced. Thus the aircraft is lifted from the ground, and climbs as necessary or desired, and when a desired height is reached, the pilot to secure horizontal travel flight, may stop the rotation of the units B, B1 by closing the hand valves 39, 37, whereupon more jet thrust will be effected from the jet tubes 59 of units B, B1 to produce high travel speed, horizontally of the aircraft, and to increase that travel speed, the pilot will then cause the electric motor 22 to operate pump 23 to draw in air or liquid (from any source) and send it under pressure to cylinders 26 at their outer ends so that the pistons 21 are all moved inwardly toward the axis of shaft 1, to thereby pull all blades about their axes in pivot pins 16, to place the blades 14 within their spaces in the U-shaped space in member 12, 13, 8 annularly thereof, so that the blades 14 then are enclosed and present no thrust against the air and no resistance of substantial amount to travel of the rotor units B, B1, as fixed wing units, through the atmospheric air, in the direction of travel, the units B, B1, then by their surfaces exteriorly of 10 and 11, causing a sufficient lift effect, as in fixed wing aircraft, to maintain the aircraft at the sufficient travel height. The motor 22 is caused to reverse the pump 23 and exhaust air from cylinders 26 when it is desired to release the blades 14, and again start the rotation of the rotor units B, B1 for landing or hovering of the aircraft. When the pilot causes the blades 14 to be retracted into their enclosing spaces, he must at the same time or slightly preceding that, disengage the clutch 48, by the means provided in connection therewith (any of the common clutch disengaging means), so that the drive from the turbines C and C1 will be discontinued and so that the units B and B1 will both some to rest, ceasing rotation.

Two driving means for rotation of the rotor units have been shown in connection with the description, but it is contemplated that either one of these driving means, either the jet propulsion by units such as the ram-jet units 28, or the turbine drive through the bevel gears and clutch means 48, may be used in the construction, without the other. Preferably both of such driving means are used with the device, so that rotation may be more easily started, and so that the turbines may more adequately serve the purposes indicated, and so that the turbines may be more adequately controlled to modify the propulsion for horizontal travel of the aircraft.

I have shown in Figure 7 two units B and B1 on an aircraft, but it is contemplated that any number of such units may be used, or that only one such unit may be used, any other known means for maintaining stability, being then used, such as any jet means for balancing and stabilizing of an aircraft or any powered type of stabilizing means. Likewise any number of blades 14 may be used. Any type of propulsion means for rotation of the units B, B1 may be used, such as rocket means instead of the ram-jet means illustrated.

While I have shown particular devices and combinations of devices in the illustration of my invention, I contemplate that other detailed devices and combinations of devices may be utilized in the realization of my invention, without departing from the spirit and intent thereof.

What I claim is:

1. In an aircraft: a fuselage structure and a pylon bearing structure mounted thereon; a discoid airfoil of substantially circular plan form and relatively thin in depth and of plan form area great enough to develop substantial lift in translational flight and having axially thereof a bearing means by which the discoid airfoil is rotatably mounted by the said pylon bearing structure to be rotatable on an axis which is perpendicular to the plane of the discoid airfoil; said discoid airfoil having surface walls of substantially circular form on the upper and lower sides of said discoid airfoil and exposed each on one side to atmospheric air; a plural number of airfoil blades each pivotably attached by a pivot at one end to said discoid airfoil at the periphery thereof to be oscillative on said pivot in a plane which is substantially the plane of the periphery of said discoid airfoil; and means to rotate said discoid airfoil with its said attached airfoil blades on its said axis.

2. The device as claimed in claim 1, and in combination; the said pylon bearing structure and said bearing means having a relation to said fuselage structure such that the plane of said periphery of said discoid airfoil and the periphery of said surface wall on the lower side of said discoid airfoil is inclined to the direction of normal horizontal travel of the aircraft for sustentation of the aircraft as a static airfoil, and means to control the said aircraft in normal flight to maintain said relation.

3. The device as claimed in claim 1, and in combination; means to swing said airfoil blades on their said pivots to positions such that the said airfoil blades lie closely adjacent said periphery of said discoid airfoil and the periphery of its said surface walls.

4. The device as claimed in claim 1, and in combination; each said airfoil blade having a form longitudinally thereof such that it will, when swung on its pivot to a retracted position, lie closely adjacent the periphery of said discoid airfoil and the periphery of its said surface walls.

5. The device as claimed in claim 1, and in combination; means for the stabilizing of the direction of flight of the said aircraft in normal horizontal travel, and means for the propulsion of the aircraft in normal horizontal travel flight.

6. The device as claimed in claim 1, and in combination; power means inter-actuably interconnected with said airfoil blades to exert torque by said means to swing each said airfoil blade about its pivot to a position such that the blades lie closely adjacent the periphery of said discoid airfoil and its said surface walls, and in the plane of the said peripheries substantially.

7. The device as claimed in claim 1, and in combination; socket space formed annularly within the peripheral boundary of said discoid airfoil for each said airfoil blade within which the airfoil blade may be deposited for an inactive condition of said blade, and means incorporated with said discoid airfoil for exerting torque upon each blade for movement of the blade about its said pivot and into its said socket space.

8. The device as specified in claim 1, and in combination; a turbo-power means mounted on said aircraft and having disconnectable driving with the said discoid airfoil for optional driving of said discoid airfoil in rotation by said bearing means, the said turbo-power means including therewith thrust reaction means for propulsion of said aircraft in normal horizontal travel.

9. In an aircraft: a fuselage structure and a pylon bearing structure mounted thereon; a discoid airfoil of substantially circular plan form and relatively thin in depth and of plan form area great enough to develop substantial lift in translational flight and having axially thereof a bearing means by which the discoid airfoil is rotatably mounted by the said pylon bearing structure to be rotatable on an axis which is perpendicular to the plane of the discoid air foil; said discoid airfoil having surface walls of substantially circular form on the upper and lower sides of said discoid airfoil and exposed each on one side to atmospheric air; a plural number of airfoil blades each pivotably attached by a pivot at one end to said discoid airfoil at the periphery thereof to be oscillative on said pivot in a plane which is substantially the plane of the periphery of said discoid airfoil; motor means and inter-connecting means between the motor means and the airfoil blades to swing the airfoil blades on their said pivots to positions such that they are each closely adjacent the periphery of the discoid airfoil; the said airfoil blades being oscillative on their said pivots, alternatively to individual positions each substantially radially extended from the axis of said discoid airfoil; the said pylon bearing structure and said bearing means having a normal relation to said fuselage structure such that the plane of said periphery of said discoid airfoil and the periphery of the surface wall on the lower side of said discoid airfoil is inclined to the direction of travel horizontally of the aircraft for sustentation, as a static airfoil, of the aircraft in normal travel, means to control the aircraft in normal flight to maintain said relation; and means to rotate said discoid airfoil with its said attached airfoil blades on its said axis.

10. The device as claimed in claim 9, and in combination: each said airfoil blade having a form longitudinally thereof such that it will, when swung on its pivot to a retracted position, lie closely adjacent the periphery of said discoid airfoil and the periphery of its said surface walls.

11. The device as claimed in claim 9, and in combination: means for the stabilizing of the direction of flight of the said aircraft in normal horizontal travel, and means for the propulsion of said aircraft in normal horizontal travel flight.

12. The device as claimed in claim 9, and in combination: socket space formed annularly within the peripheral boundary of said discoid airfoil for each said airfoil blade within which the airfoil may be deposited for an inactive condition of said blade, and means incorporated with said discoid airfoil for exerting torque upon each blade for movement of the blade about its said pivot and into its said socket space.

13. The device as claimed in claim 9, and in combination: a turbo-power means mounted on said aircraft and having as the means to rotate said discoid airfoil disconnectable driving with said discoid airfoil for optional driving of said discoid airfoil in rotation by said bearing means, the said turbo-power means including therewith thrust reaction means for propulsion of said aircraft in normal horizontal travel in air.

14. In an aircraft, a fuselage structure, a pair of discoid airfoil units each defined as in claim 9, one located rearwardly of the other an the said fuselage, each said unit having means for control of the rotation of the discoid airfoil unit, means for stabilization control of the said aircraft in normal horizontal travel in air, and means for propulsion of the said aircraft in normal horizontal travel in air.

References Cited in the file of this patent

UNITED STATES PATENTS

| | | |
|---|---|---|
| 2,623,597 | Miller et al. | Dec. 30, 1952 |
| 2,640,549 | Isacco | June 2, 1953 |
| 2,684,212 | Vanderlip | July 20, 1954 |
| 2,743,885 | Peterson | May 1, 1955 |